Jan. 13, 1970  J. MARCOVECCHIO ET AL  3,489,485
SHUTTER AND SLIT CONTROL APPARATUS FOR OPTICAL SYSTEMS
Filed June 14, 1966  3 Sheets-Sheet 2

INVENTORS: JOSEPH MARCOVECCHIO
ARTHUR J. MITTELDORF
BY
*Frederick W. Padden*
ATTORNEY

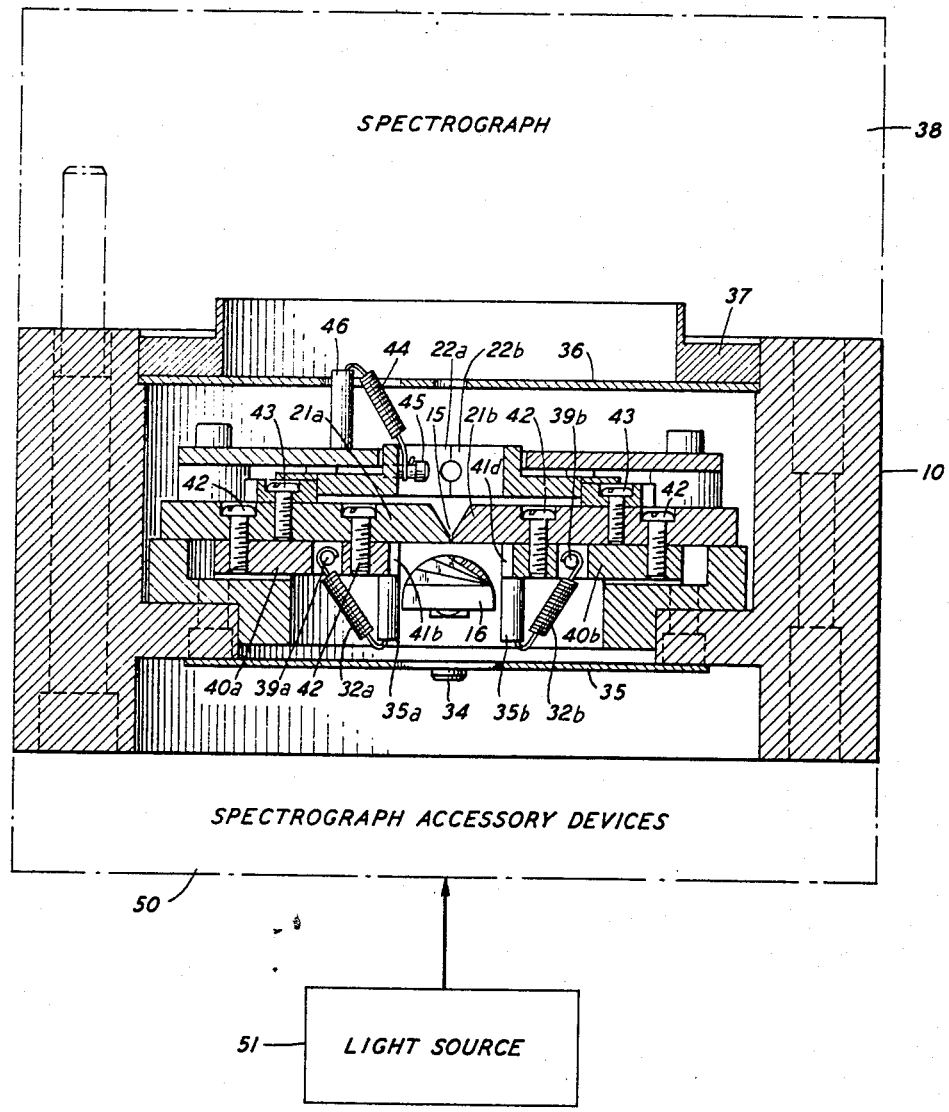

United States Patent Office 3,489,485
Patented Jan. 13, 1970

3,489,485
SHUTTER AND SLIT CONTROL APPARATUS
FOR OPTICAL SYSTEMS
Joseph Marcovecchio, North Plainfield, and Arthur J. Mitteldorf, Scotch Plains, N.J., assignors to SPEX Industries, Inc., Metuchen, N.J., a corporation of New Jersey
Filed June 14, 1966, Ser. No. 559,639
Int. Cl. G02f 1/30
U.S. Cl. 350—271                                    10 Claims

ABSTRACT OF THE DISCLOSURE

Shutter and slit apparatus is disclosed which is useful in optical spectroscopic instruments and which comprises a semi-cylindrically shaped shutter positioned longitudinally with respect to a slit. The shutter is rotatable about its axis by vernier adjustment means which permits the shutter to vary precisely the effective slit height.

---

This invention relates generally to spectroscopy, and in particular to new and improved shutter and slit apparatus for use in optical spectroscopic instruments such as spectroscopes, spectrophotometers, spectrographs, monochromators, and the like.

In spectroscopic devices, it is common to provide narrow openings either straight or curved, called slits through which light to be analyzed is passed. The simplest of these devices utilize slits of a fixed width and height; others are somewhat more versatile and provide arrangements for interchanging slits so that slits of different widths and heights may be accommodated. The more versatile of these devices have facilities for controllably varying the slit width and height. Slit adjustment facilities are required in many of the uses to which these devices are put so that different portions of the spectrum under study may be individually analyzed.

The mechanism for adjusting width as well as the effective height of the slit, i.e., the portion exposed to and through which passes the light under analysis, must meet a number of stringent prerequisites in order to be suitable for use in laboratory quality instruments. First of all, it should be free of backlash and permit the slit to be set with precision. Secondly, it should provide for the easy reproducibility of any previous setting. Thirdly, the apparatus should be light tight so that only the desired portions of the slit will be exposed to light.

The most commonly utilized expedient in the past for adjusting the effective slit height has comprised a blade having a wedged or fishtailed opening near its one end. The blade is slideably mounted on the instrument and is positioned so that it is entirely free of the slit when in one extreme of the range of positions its may assume. When the blade end is slid toward and then past the slit, the fishtailed or wedge-like aperture in its end reduces the effective slit height by exposing the slit to only the light that passes through the portion of the fishtailed blade opening intermediate the light source and the slit. The portions of the blade in front of the slit and immediately above and below the fishtailed opening are isolated from the light source. As the blade is slid further past the slit, the size of the fishtailed opening through which light can pass decreases, and in turn, decreases the effective slit height. Another means which has been extensively utilized for slit height control in the past comprises a Hartmann diaphragm, which comprises three or more individual apertures to permit the recording of different spectra in exact juxtaposition.

All of the expedients provided heretofore for adjusting slit height suffer from a number of disadvantages. First of all, blade-type devices, including the Hartmann diaphragm, are difficult to maintain light tight, especially when attaching a device such as a source or detector. Secondly, if the height of the slit is to be adjustable over a wide range, the length of the required slideable blade is objectionably long. Thirdly, it is difficult with a slideable blade to assure easy reproducibility of previous settings.

An object of our invention is to provide an improved slit adjustment means.

An object is to provide improved slit height adjustment means.

In accordance with our invention, we provide a spectroscopic slit having adjusting means comprising a new and novel shutter which performs all of the desirable functions of the prior art expedients, but yet which has none of their attendant disadvantages. More specifically, our shutter may be adjusted with precision to vary the effective height of a slit. At the same time, it is compact; it is easily light sealed; and it provides for the easy reproducibility of any desired setting. Our shutter is not of the slideable blade type, and instead, comprises a semi-cylindrically shaped member. It is positioned so that its longitudinal axis is in substantially parallel alignment with and to one side of the slit. The shutter is rotable about its longitudinal axis by a vernier adjustment means which permits the shutter to be rotated with precision to effectively vary the slit height. When in one extreme of its rotation, its open position, the shutter is not interposed between the light source and the slit for the entirety of the slit length. This permits the entire height of the slit to be utilized. As the shutter is rotated, its one side presents to the slit an effective V-shaped opening which blocks the upper and lower portions of the slit from the light in increasing amounts as the shutter rotation continues. As the shutter is rotated further, stepped fishtailed apertures reduce the slit height in fixed abrupt amounts, step by step. This permits a fixed slit height to be in effect for a limited rotation of the shutter following which the height abruptly lowers by the increment provided by the next step encountered. This step-by-step slit height reduction continues with shutter rotation until finally the opening provided by the last step is encountered and the size of this opening defines the slit height. No light strikes the slit when the shutter is rotated further until the first of a plurality of transverse Hartmann-type apertures are encountered. A plurality of such apertures is provided and any aperture may be selected for use by rotating the shutter the required amount so that the light from the subject to be analyzed passes through the selected aperture and strikes the slit. At that time, only the light from this aperture strikes the slit and hence the same type of analysis is permitted as is typical in Hartmann-type diaphragms. The shutter completely masks the slit when rotated to its closed position.

The vernier precision shutter adjustment mechanism comprises a calibrated knob fixedly attached to the shutter so that the shutter is rotated in response to the manual rotation of the knob. The knob is further provided with indentations which cooperate with spring-type plungers to assure easy reproducibility of any desired setting. The knob may be actuated by means of a rotary solenoid (not shown), if desired, rather than by hand.

The advantages provided by the shutter of our invention are that it is small, compact, readily adjustable, and light tight, and performs several functions in a single unit, all of which characteristics are advantageous for the precision work associated with laboratory quality spectroscopic instruments.

A feature of our invention is the provision of a shutter mounted longitudinally with respect to a slit and rotatably adjustable to control the slit height.

A further feature of the invention is the provision of a semi-cylindrically shaped shutter positioned longitudinally with respect to a slit and effective when it is rotated about its longitudinal axis to present an effective slit height which varies in a V-shaped manner as the shutter is rotated over a first portion of its arc, which varies in a step-by-step manner to reduce the slit height when the shutter is rotated over the next portion of its arc, and which isolates the entirety of the slit from the light to be analyzed except for that portion of the light which passes through any selected one of a plurality of apertures positioned transverse to the shutter with each aperture being controllably positioned in front of the slit as the shutter is rotated with precision to a predetermined setting which defines the preselected aperture.

These and other objects, features, and advantages of the invention will become more apparent upon a reading of the following description thereof taken in conjunction with the drawings in which:

FIG. 4 is a sectional view taken along the line 4—4 of FIG. 3;

FIG. 5 is a front elevation view of the shutter mechanism;

FIG. 6 is a side elevation view of our shutter mechanism; while

FIG. 7 comprises a perspective view of the shutter.

Figure 1:
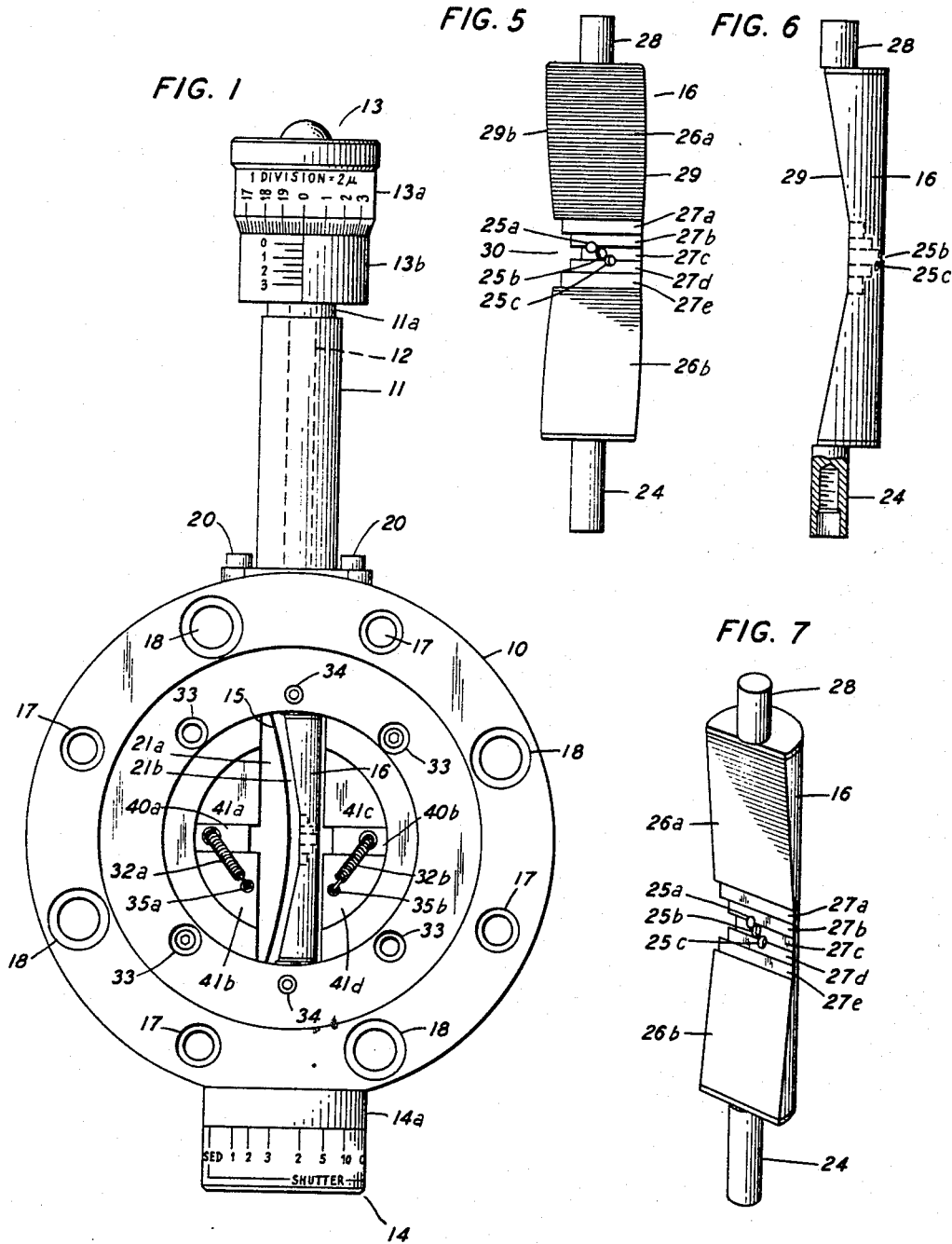
FIG. 1 is a front elevation view of the shutter and slit control apparatus embodying our invention.
Figure 2:
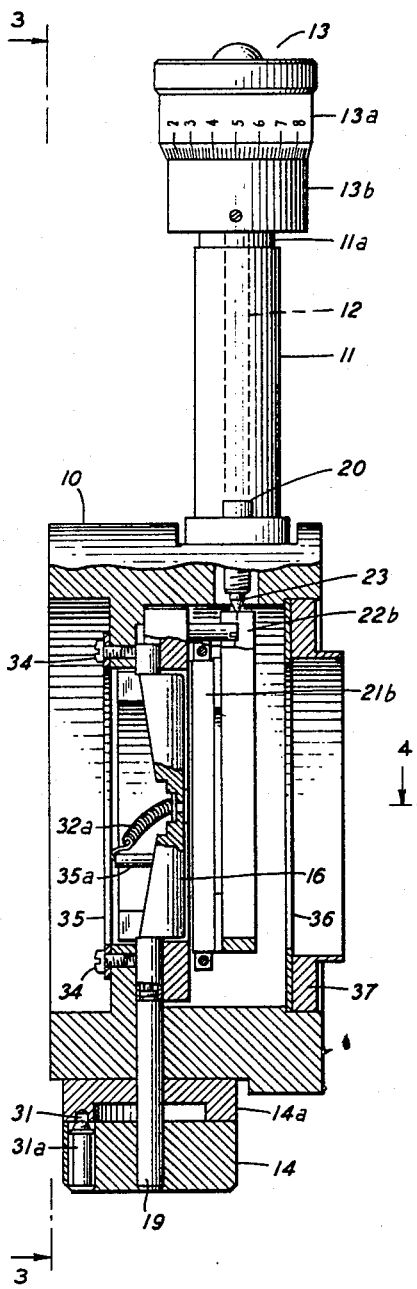
FIG. 2 is a sectional elevation view taken from the left side of the invention shown in FIG. 1.
Figure 3:
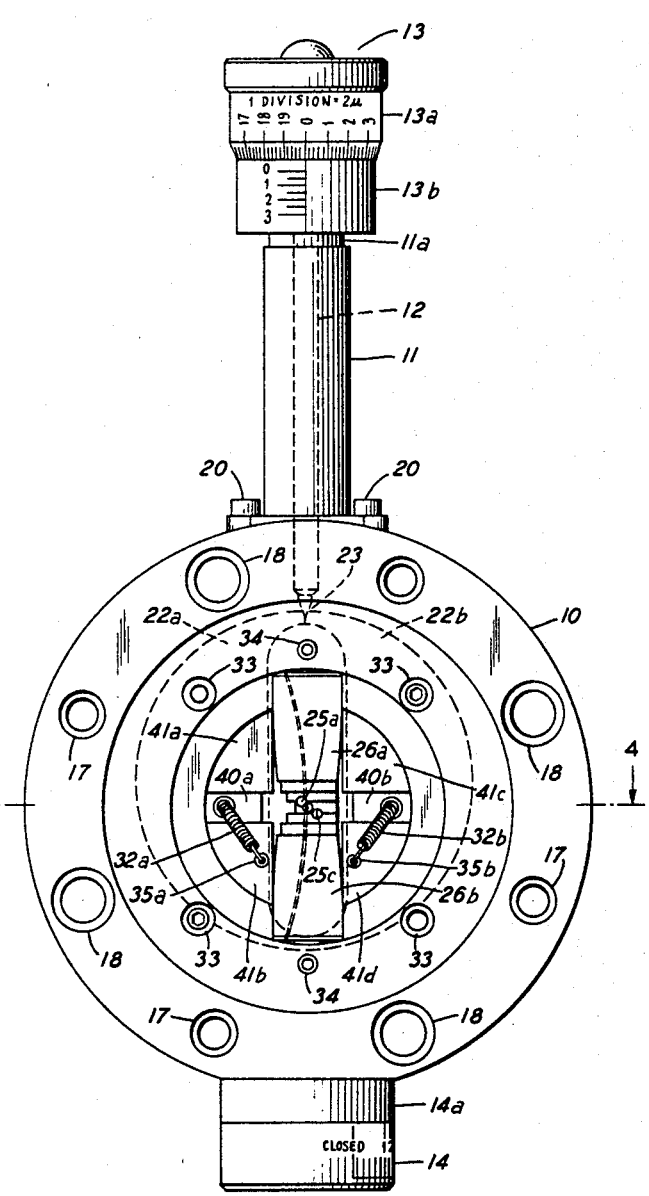
FIG. 3 is a sectional view taken along the line 3—3 of FIG. 2.

An illustrative embodiment of the invention is disclosed in the drawings which show on FIG. 1 a shutter and slit control apparatus having a hollow cylindrical base or housing 10, a shutter 16, a shutter adjustment knob 14, a slit width adjustment knob 13a, a pair of slit blade elements 21a and 21b with the spacing therebetween defining a slit 15. Affixed by screws 20 to the top side of base 10, as shown in FIG. 1, is a tube 11 which extends upwardly and has an end section 11a of a slightly reduced diameter. Coaxial with and fixably attached to the end of tube 11a is a tubular member 13b engraved with markings as shown in FIGS. 1 and 3. Tubular members 11 and 13b enclose a shaft 12, to whose top end, as shown on FIGS. 1, 2, and 3, is affixed the cylindrical width adjustment knob 13a by means of screw 13. As subsequently described, knob 13a may be rotated to adjust the width of slit 15.

Fixably attached to the bottom of base 10, as shown in FIGS. 1, 2, and 3, is a circular member 14a. Coaxially positioned below the lower end of member 14a is knob 14 which is attached by means of a shaft 19 (FIG. 2) to shutter 16. Knob 14 comprises the adjustment means by which the shutter may be selectively controlled to vary the portion of the slit that is exposed to the light source.

The shutter 16, as shown in FIGS. 5, 6, and 7, is fixably attached to an upper shaft 28 and a lower shaft 24. The bottom end of shaft 24 has a threaded hole (FIG. 2) designed to receive a threaded upper end of shaft 19 which is fixedly attached at its bottom end to adjusting knob 14. The rotation of knob 14 permits the shutter 16 to be rotated from its position shown in FIG. 1, in which the shutter is said to be open, to that shown in FIG. 3 in which the shutter is said to be near its closed position. When in its position shown in FIG. 1, the shutter does not cover any portion of the slit and it thereby permits the entire slit to be exposed. In FIG. 3, the shutter is rotated 90 degrees, with respect to its position of FIG. 1, and in this position the only light permitted to strike the slit is that which passes through hole 25b.

The shutter is formed from cylindrical material and is machined so as to have an upper surface 26a and a lower surface 26b (FIGS. 5 and 7) both of which are essentially flat, together with a plurality of machined steps 27a through 27e which are positioned in the manner shown on FIGS. 5, 6, and 7, with the right side of each step terminating on the right edge 29 of the shutter. With reference to FIG. 5, each step is inclined inwardly and extends to the left so that the left-most terminus of the five steps together form what is commonly referred to as a stepped fishtailed aperture. Holes 25a, 25b, and 25c, as shown in FIG. 5, extend through the entirety of the shutter.

This configuration of the shutter permits a precisely controlled and predetermined portion of the slit to be exposed to the light under analysis. This shutter configuration is further advantageous in that it, together with the adjusting knob, assures an easy reproducibility of any previous shutter setting. When positioned as shown in FIG. 1, the shutter is in its open position and permits the entire slit to be exposed. As the shutter adjusting knob 14 is rotated to the right slightly as shown in FIG. 1, the shutter 16 rotates a corresponding amount so that the upper and lower portions of its left edge 29b cover and shield from light the corresponding portions of the slit. As the shutter knob 14 is rotated further to the right, shutter 16 rotates a corresponding amount until its left edge 29b shields the entirety of the slit except for the stepped fishtailed configuration formed by the left terminus of each of steps 27a through 27e. When the shutter knob 14 is rotated one step further, shutter 16 rotates so that all of the slit is covered, except for the fishtail configuration formed by the leftmost terminus of step 27c together with the lower edge of step 27d and the upper edge of step 27d. Finally, as the rotation of the shutter continues, the only light that strikes the slit is that which passes through one of holes 25a, b, or c, depending upon the extent to which the shutter rotated. In its final or closed position the shutter completely covers the slit.

The calibration marks on shutter knob 14 permits any desired shutter position to be easily reproduced. In this connection and as shown on FIG. 2, the adjusting knob 14 includes a spring loaded ball indent 30 which engages holes 31 in the lower surface of member 14a. There is a plurality of such holes 31 in order that the shutter 16 may be positioned accurately in any one of a plurality of positions.

As shown in FIGS. 1 and 2, the base 10 further comprises a plurality of screws 17 and guide holes 18. The guide holes permit spectograph accessory devices 50 (FIG. 4) to be accurately aligned and attached to base 10. The base 10 also includes screws 34 (FIGS. 1 and 3) which permits the attachment of a front cover plate or mask 35 (FIG. 4). The two springs 32a and 32b are affixed at their lower ends to posts 35a and 35b, respectively. These springs function in the manner subsequently described with reference to FIG. 4 to maintain tension on the slit blade elements 21a and 21b to force them together and thereby ensure that the slit width is determined solely by the adjustment of knob 13a and in turn the pressure by which the wedge-shaped spindle 23 asserts against the top of elements 22a and 22b as shown in FIG. 3. Screws 33 attach the mechanism to body 10.

FIG. 2 comprises a left side elevation view of the apparatus shown in FIG. 1. Shown more clearly in FIG. 2 are the wedge-shaped spindle 23 which, as controlled by knob 13a, exerts a controlled amount of pressure against a V-shaped indent formed by the junction of members 22a and 22b in order to control the width of thes slit defined by the opening between elements 21a and 21b. FIG. 2 also shows the manner in which screws 34 affix the front mask plate 35 to the base 10. However, the mask 35 itself is more clearly shown on FIG. 4. FIG. 2 also clearly shows how the lower end of springs 32 are attached to posts 35a and 35b. The right side of FIG. 2 further shows a rear mask 36 which, on its left side as shown in FIG. 2, engages a portion of the base 10 and on its right side engages the ring member 37 which, by means of a force fit with base 10, maintains the rear mask in position. As shown in FIG. 4, the rear mask includes an opening through which passes the light from the slit that is to be analyzed.

FIG. 4, which comprises a cross sectional view along the line 4—4 of FIG. 3, clearly shows how the position of shutter 16 and the width of the slit 15 permit a controlled amount of light to pass from light source 51 through device 50, through a hole in front mask 35, past the shutter 16, through the slit 15, through the hole in rear mask 36, to the spectograph 38. Also, FIG. 4 clearly illustrates the relationship between the elements already discussed, and in particular, the relationship between the elements defining the slit and the means by which its width may be adjusted. Slit blade elements 21a and 21b, the spacing between which defines the slit 15, are fixably attached by means of screws 42 to elements 40a and 40b, respectively. Element 40a includes a pin 39a which connects to the upper portion of spring 32a, while element 40b includes a pin 39b which connects to the upper end of spring 32b. Posts 35a and 35b, to which are attached the lower end of these two springs, are also shown in FIG. 4. Elements 40a and 40b slide laterally as the slit width varies. The springs 32a and 32b are tensioned to minimize the width of the slit by applying a force which tends to move elements 40a and 21a to the right as shown in FIG. 4, and elements 21b and 40b to the left. However, the slit defining blade elements 21a and 21b are also permanently affixed by means of screws 43 to elements 22a, and 22b. Slit element 21a is affixed by screws 43 to element 22a, while slit element 21b is affixed to element 22b. As best shown in FIG. 3, these two elements are caused to separate a controllable amount by the wedge spindle 23 under control of knob 13a. The rotation of knob 13a exerts a controllable pressure via wedge 23 to split elements 22a and 22b a predetermined amount, and in turn, to force the slit elements 21a and 21b apart a predetermined distance to form a slot having a controlled width.

In summary of the manner in which the width of the slit is controlled, springs 32a and 32b exert pressures on members 40a and 40b to urge slit blade elements 21a and 21b together. However, the minimum distance in which these two elements may be positioned with respect to each other is controlled by the position of the wedge 23 as it exerts the required force to maintain elements 22a and 22b apart, and in turn, the slit blades 21a and 21b a predetermined distance apart to define a slit having a required width.

Spring 44 (FIG. 4) is affixed at one end to screw 45 and at the other end to screw 46 in order to maintain members 22a and 22b away from the slit blades 21a and 21b.

In summary of the foregoing, it may be seen that the invention is advantageous and is an improvement in the art in that it provides in a housing of moderate size, a slit whose width and height may be adjusted with a vernier precision together with a new and novel light-tight shutter which, when rotated by a vernier adjustment means, permits precisely controlled portions of the slit to be exposed to light. The invention is further advantageous in that any given sized slit opening or any given shutter adjustment is easily reproducible by means of the vernier precision adjustments embodying our apparatus. A further advantage of our invention resides in the fact that the shutter utilized is compact and yet is shaped in such a manner so as to permit the effective height of the slit to be controlled over a range as great as that formerly associated with devices of a much larger size, such as, for example, sliding bars, pivoting discs, et cetera, which are difficult to maintain light tight and difficult to reproduce a given size shutter opening.

It is to be understood that the above-described arrangements are but illustrative of the application of the principles of the invention. Numerous other arrangements may be devised by those skilled in the art without departing from the spirit and scope of the invention.

What is claimed is:

1. Apparatus for optical instruments comprising, a pair of opaque members having a distance therebetween defining an optical slit, semi-cylindrically shaped shutter means rotatably adjustable between an open and a closed position to control the effective height of said slit, said shutter means positioned between said slit and incident light rays and having one or more opaque surfaces which variably obstruct the passage of light to said slit as said shutter means is rotatably adjusted, and adjustment means for controlling the rotary position of said shutter means.

2. The invention of claim 1 in combination with means for controlling the spacing between said members defining an optical slit.

3. The invention of claim 1 wherein said one or more surfaces form a V-shaped side of said shutter means for reducing the slit height as said shutter is rotated from its open position.

4. The invention of claim 3 wherein other said opaque surfaces have a stepped portion for reducing the slit height in stepped decrements as the shutter is rotated from its open to its closed position.

5. In a spectroscopic device, a slit defined by a pair of spaced apart members, a semi-cylindrically shaped shutter positioned longitudinally with respect to the slit in a plane between said slit and incident light rays and operative for controlling the effective height of the slit, means for rotating such said shutter, means on said shutter effective with its rotation from an open position, in which the entirety of the slit is exposed to incident light rays to be analyzed, for progressively causing less than the entirety of the slit to be exposed, apertures in said shutter effective with its further rotation to define that portion of the light to be analyzed exposed to said slit, and means on said shutter effective with its rotation to a final position for blocking the entirety of the slit from said light rays.

6. The invention of claim 5 in which the shutter comprises an effective V-shaped portion for continuously reducing the height of the slit as the shutter is first rotated from its open position, a stair-shaped fishtailed portion for reducing the effective height of the slit in stepped decrements as the shutter is further rotated, and a plurality of overlapping apertures for permitting juxtaposed portions of the spectrum to be analyzed as the shutter is rotated further.

7. Apparatus for optical instruments comprising a hollow cylindrical housing, slit blade members having edges positioned apart from one another to define a slit, means for positioning said blade members inside of said housing in a plane transverse to the longitudinal cylindrical axis of said housing, slit width adjustment means rotably affixed to said cylindrical housing, a shaft fixably attached to said adjustment means and extending from said adjustment means through the wall of said housing, a wedge defining member cooperatively attached to said shaft, means attached to said blade members and having a V-shaped indent cooperating with said wedge whereby pressure is exerted by said wedge against said indent as said adjustment means is rotated to vary the spacing between said slit blade members and thereby to vary the slit width, an elongated shutter having a semi-cylindrical shape, means for positioning said shutter so that its longitudinal axis is on one side of said slit and parallel to the plane defined by said slit blade members, shutter adjustment means for controlling the slit height rotably affixed to the outer edge and opposite side of said cylindrical base with respect to the slit width adjustment means, and a shaft on the one end of said shutter fixably attached to said shutter adjustment means.

8. The invention of claim 7 wherein said shutter comprises, means effective as the shutter adjustment means and the shutter are in a closed position for exposing the entirety of said slit to a source of light to be analyzed, means effective as the shutter is initially rotated by said shutter adjustment means for reducing the effective height of said slit as said shutter is rotated, means effective as said shutter is rotated further for reducing the effective height of said slit in stepped decrements, and means effective as its rotation is continued for blocking the entirety of said shutter from said source of light.

9. The invention of claim 1 wherein said opaque surfaces are traversed by a plurality of transverse apertures.

10. The invention of claim 8 wherein said shutter includes a plurality of apertures transverse to its longitudinal axis.

References Cited

UNITED STATES PATENTS

| | | | |
|---|---|---|---|
| 2,664,028 | 12/1953 | Meyer et al. | 350—271 |
| 2,722,611 | 11/1955 | Haupt | 350—275 |

JEWELL H. PEDERSEN, Primary Examiner

O. B. CHEW II, Assistant Examiner

U.S. Cl. X.R.

350—275